INVENTOR.
John M. Lee

INVENTOR.
John M. Lee

United States Patent Office 3,345,153
Patented Oct. 3, 1967

3,345,153
SOLUBILIZING PHOSPHATE ROCK WITH AN AMMONIUM PHOSPHATE-AMMONIUM BISULFATE MELT
John Malcolm Lee, Lake Jackson, Tex., assignor to The Dow Chemical Company, Midland, Mich., a corporation of Delaware
Filed Nov. 25, 1964, Ser. No. 413,821
6 Claims. (Cl. 71—36)

ABSTRACT OF THE DISCLOSURE

The method of solubilizing phosphate rock and recovering water-soluble citrate-soluble phosphate values therefrom by admixing with a $Ca_3(PO_4)_2$-containing rock in a suitable reaction vessel specific proportions of $NH_4HSO_4$ and $NH_4H_2PO_4$ at a temperature above about 120° C. and preferably below about 170° C. to effectuate a melt of the $NH_4HSO_4$ and $NH_4H_2PO_4$ and separating the water-soluble citrate-soluble phosphates from the predominantly water-insoluble citrate-insoluble $CaSO_4$.

---

Figure 1:
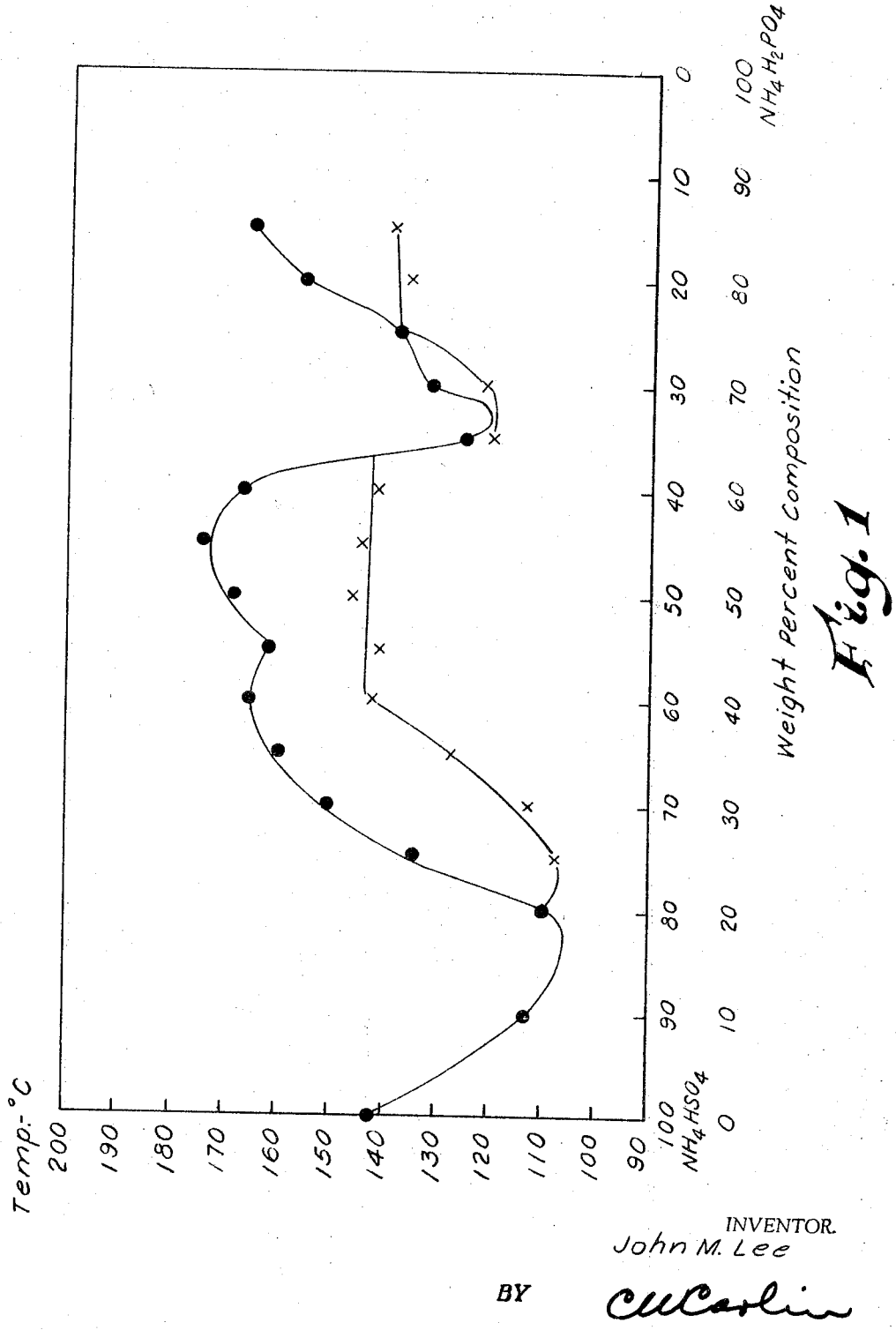

The invention is concerned with the recovery of phosphates from phosphate-containing rock or ore.

Phosphates have a prominent place in many industrial processes and in the preparation of widely used end products, e.g. water softeners, fertilizers, and chemicals.

Natural phosphate-containing rock has long been a primary source of useful phosphate material. In order for vegetation to utilize the phosphorus contained in natural rock phosphate, the rock must be treated in some manner to convert the highly insoluble calcium phosphate to a water-soluble form.

Processes for recovering phosphates from natural sources have included the use of such acids as hydrochloric, sulfuric, and nitric or strong bases such as aqueous solutions of NaOH to produce a water-soluble phosphate. However, such processes have been uneconomical of time, undesirably inefficient, and have entailed unsatisfactory aspects. For example, when sulfuric acid is used, especial care must be exercised to prevent formation of $CaSO_4$ on the surface of the ore particles, thereby retarding further reaction of the acid with the phosphate values present. As a further example of the unsatisfactory aspects, when either hydrochloric or nitric acid is used, the phosphate rock reacts rapidly by subsequent necessary separation of the soluble calcium salts that are formed is difficult. As a further example of unsatisfactory aspects of known practices, when a solution of a strong base is used to prepare phosphate intended for use in fertilizer, much of the ore is left substantially unchanged and the strong base remaining in the soluble portion has to be neutralized or otherwise removed from the potential fertilizer. A further disadvantage associated with all of the above processes is that usually the ore must be first calcined before treatment.

There is, accordingly, a continuing need for a more satisfactory method of producing phosphates for general use including the conversion of insoluble calcium phosphate to a water-soluble form for utilization by vegetation. The invention meets this need by providing a method of recovering phosphates from natural phosphate rock or ore, which does not require prior calcining and which can be recovered at a relatively low temperature, to yield a material of a high phosphate content. The phosphate values in the material so produced are soluble in either water or water containing the citrate radical. The material can be used directly as fertilizer or it can be purified, as by centrifugation, to produce a generally satisfactory marketable product.

The invention is based on the discovery that a molten mixture of ammonium hydrogen sulfate, i.e. $NH_4HSO_4$, and ammonium dihydrogen phosphate, i.e. $NH_4H_2PO_4$, in a specified weight ratio (subsequently stated), in admixture with crushed calcium phosphate in a specified ratio, and the temperature of the resulting admixture maintained above the melting point of the $NH_4HSO_4/NH_4H_2PO_4$ mixture employed, a phosphate product is formed which can be separated and readily used without further treatment as a fertilizer or which may be purified to produce a commercial grade phosphate for general use.

The method of the invention is carried out by admixing specific proportions of $NH_4HSO_4$ and $NH_4H_2PO_4$ wtih $Ca_3(PO_4)_2$-containing rock in a suitable reaction vessel, at a temperature above about 120° C. and preferably below about 170° C., to effect a melt of the $NH_4HSO_4$ and $NH_4H_2PO_4$, and centrifuging the melt to separate water-soluble or citrate-soluble phosphates from predominantly water-insoluble, citrate-insoluble $CaSO_4$. The following parts by weight are preferably employed in the practice of the invention:

$NH_4HSO_4$ ----------------------------about 20 to 40
$NH_4H_2PO_4$ ---------------------------about 80 to 60
$Ca_3(PO_4)_2$ [1] ------------------------about 1 to 20

[1] The calcium phosphate, expressed as bone phosphate of lime, is contained in naturally occurring phosphate rock, crushed preferably to a size not substantially larger than that which will pass through a number 40 mesh sieve.

The weight ratio of $NH_4HSO_4$ to $NH_4H_2PO_4$ is preferably not over about 0.25 and the proportion of both $NH_4HSO_4$ and $NH_4H_2PO_4$ to the $Ca_3(PO_4)_2$ present is preferably between about 1 and about 5.

The proportions of the three required $NH_4HSO_4/NH_4H_2PO_4/Ca_3(PO_4)_2$ may be expressed as preferably being between 40/60/20 and 20/80/1.

As the parts of $NH_4HSO_4$ employed approach the recommended maximum of about 40 parts, the amount of $Ca_3(PO_4)_2$ contained in the ore may be increased to about 20 parts. Best results are obtained when the proportion of $NH_4HSO_4$ does approach the 40 parts value since the amount of $Ca_3(PO_4)_2$ that will be converted to soluble phosphates thereby approaches the desirable maximum of 20 parts.

The graph comprising FIGURE 1 of the drawing shows, along the vertical axis, the solidification points in degrees centigrade, of 100 percent $NH_4HSO_4$ and of various mixtures of $NH_4HSO_4$ and $NH_4H_2PO_4$ set out along the horizontal axis, wherein $NH_4H_2PO_4$ was admixed with the $NH_4HSO_4$ to provide decrements of the sulfate and corresponding increments of the phosphate up to about 85 percent of $NH_4H_2PO_4$ and about 15 percent $NH_4HSO_4$.

The values on the graph were obtained more specifically by the following procedure:

The mixture employed was prepared at a temperature sufficiently high to assure that it was above the soldification temperature. The mixture so made was then cooled until crystals were clearly seen to begin to form. This temperature, in each instance, is indicated on the graph by a solid circle. As the proportion of the $NH_4H_2PO_4$ was increased beyond about 20% of the mixture, it was noted that an appreciable temperature drop occurred between the temperature at which crystals were seen to begin to form and the temperature at which the mixture became a solid as shown on the graph in each instance by an X. The portion of the curve extending from about the 40% $NH_4HSO_4$ and the 60% $NH_4H_2PO_4$ mixture to about 20% $NH_4HSO_4$ and 80% $NH_4H_2PO_4$ mixture represents the preferred proportions for use in the practice of the invention. Proportions to the left of the designated proportions on the graph are operable but not preferred for various reasons among which are: such proportions produce a final product having an N/P ratio which is usually outside the range usually specified for fertilizer use.

For example, when employing ratios of $NH_4HSO_4$ to $NH_4H_2PO_4$ of from about 40/60 to about 80/20 which are outside the preferred range but operable, such less preferred ratios require higher temperatures (as seen on the graph) and as a result cause formation of some undesired phosphates.

Figure 2:
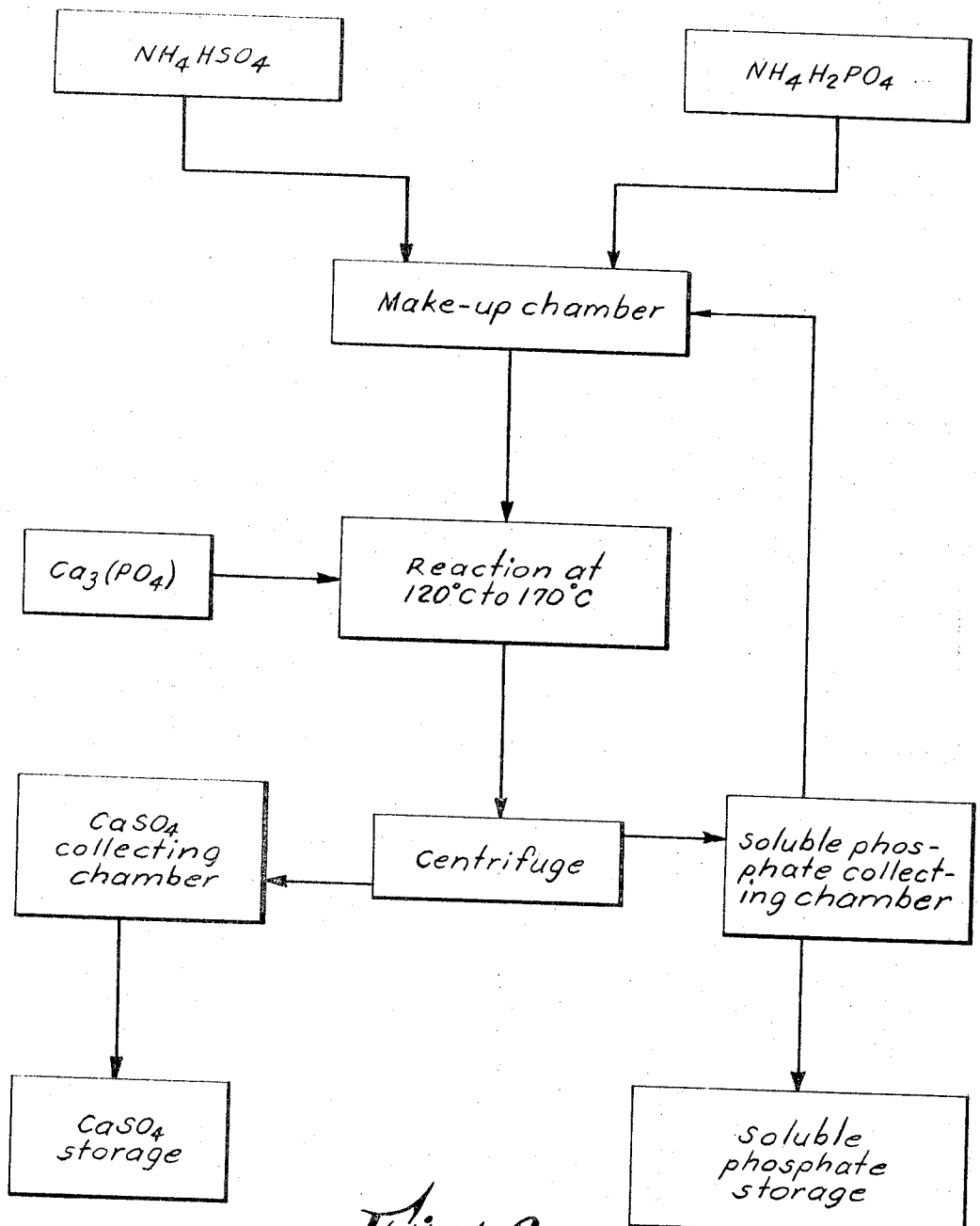

The flow sheet forming FIGURE 2 of the drawing is a schematic presentation of the continuous mode of operation according to the invention. As shown by the flow sheet a mixture of $NH_4HSO_4$ and $NH_4H_2PO_4$ is prepared in a make-up chamber and fed into a heated reactor where it is admixed with and reacted with crushed $Ca_3(PO_4)_2$ rock at the specified temperature (which as stated must be above about 120° C. and preferably below about 170° C.) and passed from the reactor into a centrifuge where the phosphate melt is separated from the solids comprising the $CaSO_4$ and gangue. From the centrifuge, the melt, now richer in phosphate values than the original mixture of $NH_4HSO_4$ and $NH_4H_2PO_4$, is drawn off into a second collecting chamber. In this second collecting chamber, a separation is effected whereby a desirable proportion of the melt is recycled back to the make-up chamber and admixed with a sufficient amount of $NH_4HSO_4$ to maintain therein the desired ratio of $NH_4HSO_4$ and $NH_4H_2PO_4$. The balance of the melt, largely $NH_4H_2PO_4$, is drawn off to storage and is in condition for use as for fertilizer or further purification, if desired.

The following examples are illustrative of modes of carrying out the invention:

*Example 1*

A three-necked flask was placed in an oil-bath and maintained at a 160° C. The flask was provided with a variable speed stirrer, a thermometer, and suitable means for admitting reactants thereinto. To the flask were added 240 grams $NH_4HSO_4$ and 360 grams $NH_4H_2PO_4$. The contents were heated to 160° C. whereupon the mixture melted. 114 grams of phosphate rock, containing about 72.37% by weight $Ca_3(PO_4)_2$ (82.5 grams) of about 100 mesh size, were added slowly accompanied by stirring, and thereafter heated at 160° C. with continued slow stirring for about an hour. The flask was thereafter removed from the oil bath and the contents poured into a centrifuge, which was heated to 120° C. Centrifuging effected the desirable separation of the solid $CaSO_4$ and gangue from the phosphate rich melt. The melt, comprising essentially water- or citrate-soluble phosphates, was then analyzed, employing the ammonium molybdate method described by Willard and Diehl in "Advanced Quantitative Analysis," 1946, page 196. The analysis showed that the melt contained 70% $NH_4H_2PO_4$. This percentage of $NH_4H_2PO_4$, compared with the original composition containing 60% $NH_4H_2PO_4$, showed a loss in sulfate and a gain in phosphate values. The "solids" portion, removed from the melt by the centrifugation, contained a substantial amount of $CaSO_4$ along with the gangue.

*Example 2*

The procedure set out in Example 1 above was repeated except that the centrifugation step was made more effective by increasing the temperature to about 150° C. to maintain a lower viscosity of the melt and improve the separation.

Analysis of the various fractions recovered from the centrifuge showed the following phosphorus content, calculated as $NH_4H_2PO_4$:

| | Grams |
|---|---|
| In the melt that was centrifuged out | 300 |
| In the centrifuge recovered by eluting with water | 5.5 |
| Remaining in the reactor (recovered by eluting with water) | 14.9 |
| Water-eluting from the centrifuge after operation | 68.2 |
| Further recovered from centrifuge by acid leach | 32.2 |

Since the ore contained 82.5 grams $Ca_3(PO_4)_2$, the total phosphorus in the system amounted to 421.2 grams (calculated as $NH_4H_2PO_4$). Therefore, it can readily be seen that the recovery was substantially theoretical. Analysis of the separated "melt" showed that along with the $NH_4HSO_4$ and $NH_4H_2PO_4$ there was also the following:

| | Percent |
|---|---|
| Fluorine (F) | 0.4 |
| Calcium (Ca) | 0.4 |
| Iron (Fe) | 0.1 |

This shows that the undesirable calcium, fluorine, and other unwanted gangue materials are not present in the melt in any objectionable quantities.

*Example 3*

In another run 0.78 part of $NH_4HSO_4$ was heated to about 160° C. for about 15 minutes with 1.0 part of phosphate rock (72 BPL) and about 45% of the phosphate values were converted to citrate-soluble form. This total mixture was found to be useful as a fertilizer in growth media in which a high N to P ratio is not required.

*Example 4*

In another run 1.5 parts $NH_4HSO_4$ were reacted with 1.0 part of phosphate rock (72 BPL) for about 15 minutes at 160° C., about 87% of the phosphate values were converted to citrate-soluble values. The total mixture, having 4.4% N and 14.6% $P_2O_5$, was found to yield a fertilizer material that could be used in growth media where a high N to P ratio is not required.

Although any temperature between about 120° C. and about 170° C. is used, depending on the melt temperature for the $NH_4HSO_4$ and $NH_4H_2PO_4$ ratio involved, best results are obtained when the temperature is maintained between about 125° C. and about 160° C. Temperatures below about 125° C. tend to give decreased reaction rates and temperatures above about 160° C. tend to give condensation products of the phosphate which yields non-water soluble material. Although any time range for the reaction of between about 10 minutes and 2 hours is satisfactory, best results are obtained when the reaction time is between about 15 minutes and 1.5 hours. The shorter reaction periods tend to result in insufficient reaction and periods longer than about 2 hours (providing the temperature does not exceed 160° C.) although in no way impairing the product produced, do not improve the product and are, accordingly, an uneconomical expenditure of time. The reaction is best carried out at atmospheric pressure or in a closed system under autogenous pressure. Pressures less than atmospheric tend to show a loss of $NH_3$ which is not seriously objectionable, but does present a problem of loss of N and need for recovery of the $NH_3$. Pressures above atmospheric indicate neither disadvantage or advantage except to insure that no $NH_3$ is emitted and, accordingly, higher pressures than autogenous pressures would not be warranted from an economic point of view. The preferred proportion of the reactants to employ, as shown in the attached graph, are from 20% $NH_4HSO_4$ to 40% $NH_4HSO_4$ and from 80% to 60% $NH_4H_2PO_4$. The optimum proportions to employ are about 40 parts $NH_4HSO_4$ and about 60 parts $NH_4H_2PO_4$ with which may be admixed about 20 parts of $Ca_3(PO_4)_2$. Up to about 80 parts of $NH_4H_2PO_4$ may be employed. However, if the proportion of $NH_4H_2PO_4$ exceeds 80 parts by weight in such mixture, the freezing point of the melt will exceed the preferred temperature limit of about 160° C. and, above this high concentration of $NH_4H_2PO_4$, there is a tendency for the $NH_4H_2PO_4$ to decompose.

Having described my invention what I claim and desire to protect by Letters Patent is:

1. The method of converting water-insoluble and citrate-insoluble phosphate values in $Ca_3(PO_4)_2$-containing rock to water-soluble and citrate-soluble phosphate values, which comprises reacting between about 1 and about 5 parts by weight of a molten mixture of $NH_4HSO_4$ and $NH_4H_2PO_4$, wherein the weight ratio of $NH_4HSO_4$ to $NH_4H_2PO_4$ is not in excess of about 0.25 with one part of particulated $Ca_3(PO_4)_2$-containing rock, at a temperature above the melting point of said mixture and below about 170° C.

2. The method according to claim 1 wherein the proportions of $NH_4HSO_4$, $NH_4H_2PO_4$, and $Ca_3(PO_4)_2$ are between about 40/60/20 and about 20/80/1.

3. The method of converting water-insoluble and citrate-insoluble phosphate values in $Ca_3(PO_4)_2$-containing rock to water-soluble and citrate-soluble phosphate values which comprises: (1) admixing particulated $Ca_3(PO_4)_2$-containing rock with a molten mixture of $NH_4HSO_4$ and $NH_4H_2PO_4$, to obtain weight proportions of $NH_4HSO_4/NH_4H_2PO_4/Ca_3(PO_4)_2$ of between about 40/60/20 and about 20/80/1; (2) allowing the reaction to continue for a period of from 10 minutes to 2 hours at above the melting point and at less than about 170° C. to provide a soluble phosphate melt; (3) separating a portion of the melt from the solids; (4) recycling the remaining portion of the melt to the reactor; (5) adding sufficient amount of $NH_4HSO_4$ to the remaining melt to readjust the $NH_4H_2PO_4/NH_4HSO_4$ proportions to between about 60/40 and about 80/20; (6) adding particulated $Ca_3(PO_4)_2$-containing rock to the melt to maintain proportions of $$NH_4HSO_4/NH_4H_2PO_4/Ca_3(PO_4)_2$$

of between about 40/60/20 and about 20/80/1; and (7) thereafter repeating steps (4), (5), and (6) and continuing to separate a portion of the phosphate melt from the heated molten mixture.

4. The method of recovering water-soluble, citrate-soluble phosphates from $Ca_3(PO_4)_2$-containing rock comprising admixing from between about 40 parts and about 20 parts of $NH_4HSO_4$ and between about 60 parts and about 80 parts of $NH_4H_2PO_4$, to make a total of 100 parts thereof with sufficient of said rock to provide between about 1 and about 20 parts of $Ca_3(PO_4)_2$, said rock having perviously been crushed to a particle size not substantially in excess of that which will pass through about a 60 mesh sieve; heating and stirring the resulting mixture at a temperature at which the $NH_4HSO_4$ and $NH_4H_2PO_4$ is molten and not less than about atmospheric pressure for from about 10 minutes to about 2 hours accompanied by agitation; and thereafter effecting a separation of solid $CaSO_4$ material from the molten phosphate material.

5. The method according to claim 4 wherein the separation of the solid $CaSO_4$ material from the molten phosphate material is effected by centrifugation.

6. The continuous method of recovering water-soluble, citrate-soluble phosphates from $Ca_3(PO_4)_2$-containing rock which comprises: (1) admixing between about 40 and about 20 parts by weight of $NH_4HSO_4$ and between about 60 and about 80 parts by weight $NH_4H_2PO_4$ to make a total of 100 parts thereof, with particulated $Ca_3(PO_4)_2$ rock containing between about 1 and about 20 parts of $Ca_3(PO_4)_2$; (2) heating the mixture so made for from about 10 minutes to about 2 hours at a temperature between about 120° C. and about 170° C. at not less than about atmospheric pressure to produce water-soluble, citrate-soluble phosphates and substantially water-insoluble $CaSO_4$; (3) centrifuging the resulting mixture to effect a separation of $CaSO_4$ solids from molten phosphate mixture; (4) drawing off the substantially water-insoluble, citrate-insoluble sulfate to storage and the water-soluble, citrate-soluble phosphates to a separatory means and recycling back a sufficient proportion of said soluble phosphates into the feed mixture entering the reaction chamber to maintain a ratio therein of between about 40 and about 20 parts by weight of $NH_4HSO_4$ and between about 60 and about 80 parts by weight of $NH_4H_2PO_4$ to make a total of 100 parts thereof; (5) drawing off the remaining soluble phosphate from the separatory means.

References Cited
UNITED STATES PATENTS

| | | | |
|---|---|---|---|
| 1,002,143 | 8/1911 | Frerichs | 71—46 |
| 1,002,198 | 8/1911 | Frerichs | 71—46 |
| 1,251,742 | 1/1918 | Blumenberg | 71—34 |
| 1,293,220 | 2/1919 | Shuey | 71—46 |
| 2,750,270 | 6/1956 | Barnes | 71—34 |
| 2,776,198 | 1/1957 | Turbett | 71—36 |

DONALL H. SYLVESTER, *Primary Examiner.*

T. D. KILEY, *Assistant Examiner.*